(12) United States Patent
Tod et al.

(10) Patent No.: US 12,475,393 B2
(45) Date of Patent: Nov. 18, 2025

(54) QUBIT SENSORY REPRESENTATION

(71) Applicant: International Business Machines Corporation, Armonk, NY (US)

(72) Inventors: Madeleine Tod, Ashtead (GB); Andrew James Stanford-Clark, Chale (GB)

(73) Assignee: International Business Machines Corporation, Armonk, NY (US)

( * ) Notice: Subject to any disclaimer, the term of this patent is extended or adjusted under 35 U.S.C. 154(b) by 1278 days.

(21) Appl. No.: 16/537,736

(22) Filed: Aug. 12, 2019

(65) Prior Publication Data

US 2021/0049491 A1 Feb. 18, 2021

(51) Int. Cl.
| | | |
|---|---|---|
| *G06N 10/20* | (2022.01) | |
| *B82Y 10/00* | (2011.01) | |
| *G06F 17/11* | (2006.01) | |
| *G06N 10/80* | (2022.01) | |

(52) U.S. Cl.
CPC .............. *G06N 10/20* (2022.01); *B82Y 10/00* (2013.01); *G06F 17/11* (2013.01); *G06N 10/80* (2022.01)

(58) Field of Classification Search
CPC .......... G06N 10/00; B82Y 10/00; G06F 17/11
USPC ........................................................ 708/802
See application file for complete search history.

(56) References Cited

U.S. PATENT DOCUMENTS

| | | | |
|---|---|---|---|
| 5,170,464 A | 12/1992 | Hayes | |
| 9,633,313 B2 * | 4/2017 | Svore | ..................... G06N 10/00 |
| 9,940,586 B1 | 4/2018 | Epstein | |
| 11,176,478 B2 * | 11/2021 | Van den berg | ........ G06N 10/00 |
| 11,301,770 B2 * | 4/2022 | Genin | .................. G06N 3/0445 |
| 11,327,345 B2 * | 5/2022 | Leipold | ............. H01L 29/66439 |
| 2007/0215862 A1 * | 9/2007 | Beausoleil | ............. B82Y 10/00 |
| | | | 708/813 |
| 2014/0264288 A1 | 9/2014 | Svore | |

(Continued)

FOREIGN PATENT DOCUMENTS

| | | |
|---|---|---|
| CN | 103942753 A | 7/2014 |
| CN | 103971328 A | 8/2014 |

(Continued)

OTHER PUBLICATIONS

Mell, et al., "The NIST Definition of Cloud Computing", Recommendations of the National Institute of Standards and Technology, NIST Special Publication 800-145, Sep. 2011, 7 pages.

(Continued)

*Primary Examiner* — Ori Nadav
(74) *Attorney, Agent, or Firm* — Aaron N. Pontikos (57) ABSTRACT

According to one embodiment of the present invention, a computer-implemented method of generating a sensory representation of a qubit is disclosed. The computer-implemented method includes determining a point in a Bloch sphere based on the qubit, in which the point is defined by a value of colatitude (theta) with respect to the z-axis of the Bloch sphere, and a value of longitude (phi) with respect to the x-axis of the Bloch sphere. The computer-implemented method further includes converting the value of colatitude (theta) to a value of a first variable of a sensory output space. The computer-implemented method further includes converting the value of longitude (phi) to a value of a second variable of the sensory output space.

10 Claims, 7 Drawing Sheets

(56) References Cited

U.S. PATENT DOCUMENTS

| | | | |
|---|---|---|---|
| 2014/0324766 A1 | 10/2014 | Alboszta | |
| 2017/0194930 A1 | 7/2017 | Wiebe | |
| 2017/0206461 A1 | 7/2017 | Friesen et al. | |
| 2018/0046933 A1* | 2/2018 | La Cour | G06F 12/023 |
| 2019/0042971 A1 | 2/2019 | Zou | |
| 2019/0392339 A1* | 12/2019 | Leipold | H03M 1/66 |
| 2020/0193301 A1* | 6/2020 | Roquet | G16B 50/30 |
| 2020/0301562 A1* | 9/2020 | Gupta | G06F 9/455 |

FOREIGN PATENT DOCUMENTS

| | | |
|---|---|---|
| CN | 106462808 A | 2/2017 |
| CN | 107683460 A | 2/2018 |
| CN | 108780129 A | 11/2018 |
| JP | 0689177 A | 3/1994 |
| WO | 2018236922 A1 | 12/2018 |
| WO | 2021028738 A1 | 2/2021 |

OTHER PUBLICATIONS

Pineda et al., "Any pure initial state of the qubit can be mapped onto the Bloch sphere", Mar. 2007, 7 pages, <https://www.researchgate.net/figure/Any-pure-initial-state-of-the-qubit-can-be-mapped-onto-the-Bloch-sphere-Here-we-show_fig2_2200716>.

Wootton, Dr. James, "Visualizing Bits and Qubits", Feb. 6, 2018, 22 pages.

Xiao, Geoffrey, "Color coding a vector field", Stack Overflow, Mar. 27, 2017 at 17:30, 2 pages, <https://stackoverflow.com/questions/43052872/color-coding-a-vector-field>.

International Search Report and Written Opinion, International Application No. PCT/IB2020/056258, International Filing Date Jul. 2, 2020.

Barthel et al., "Interlaced Dynamical Decoupling and Coherent Operation of a Singlet-Triplet Qubit", arXiv:1007.4255v3 [cond-mat.mes-hall] Dec. 16, 2010, 4 pages.

Pal et al., "Pure color object extraction from a noisy state using quantum version parallel self organizing neural network", International Journal of Computers and Applications, vol. 38, Nos. 203, 164-186, published online: Oct. 14, 2016, 24 pages, <http://dx.doi.org/10.1080/1206212X.2016.1237164>.

Notice of Allowance dated Dec. 28, 2022 from Chinese Application No. CN202080057.8 filed Jul. 2, 2020, 4 pps.

"Bloch sphere", from Wikipedia, the free encyclopedia, Aug. 9, 2019, 6 pps.

Altepeter et al., "Multiple-Qubit Quantum State Visualization", © 2009 OSA/CLEO/IQEC 2009, 2 pps.

Yan et al., "Bloch Sphere-Based Representation for Quantum Emotion Space", Journal of Advanced Computational Intelligence and Intelligent Informatics, vol. 19 No. 1, 2015, 9 pps.

Notice of Reasons for Refusal dated Nov. 21, 2023 from Japanese Patent Application No. 2022-507553 filed Jul. 2, 2020, 4 pps.

Urushidani, "Production of a Calculator for single-qubit gates using PIC microcomputer", Interface, vol. 45, No. 3, CQ Publishing Co., Ltd., Mar. 1, 2019, pp. 29-36 (English translation of first page only).

* cited by examiner

QUBIT SENSORY REPRESENTATION

BACKGROUND

The present invention relates generally to the field of qubits, and more particularly to generating a sensory representation of a qubit.

Instead of using classical (binary) bits, quantum computers use qubits, which can be in superpositions of states. Where a classical bit can have one of two values, 1 or 0, a qubit can take any one of an infinite number of values. Thus, in quantum computing, a qubit (or quantum bit) is the basic unit of quantum information, i.e. the quantum version of the classical binary bit physically realized with a two-state device. A qubit is a two-state (or two-level) quantum-mechanical system, one of the simplest quantum systems displaying the peculiarity of quantum mechanics.

SUMMARY

According to one embodiment of the present invention, a computer-implemented method of generating a sensory representation of a qubit is disclosed. The computer-implemented method includes determining a point in a Bloch sphere based on the qubit, in which the point is defined by a value of colatitude (theta) with respect to the z-axis of the Bloch sphere, and a value of longitude (phi) with respect to the x-axis of the Bloch sphere. The computer-implemented method further includes converting the value of colatitude (theta) to a value of a first variable of a sensory output space. The computer-implemented method further includes converting the value of longitude (phi) to a value of a second variable of the sensory output space.

According to another embodiment of the present invention, a computer program product for generating a sensory representation of a qubit is disclosed. The computer program product includes one or more computer readable storage media and program instructions stored on the one or more computer readable storage media. The program instructions include instructions to determine a point in a Bloch sphere based on the qubit, in which the point is defined by a value of colatitude (theta) with respect to the z-axis of the Bloch sphere, and a value of longitude (phi) with respect to the x-axis of the Bloch sphere. The program instructions further include instructions to convert the value of colatitude (theta) to a value of a first variable of a sensory output space. The program instructions further include instructions to convert the value of longitude (phi) to a value of a second variable of the sensory output space.

According to another embodiment of the present invention, a computer system for generating a sensory representation of a qubit is disclosed. The computer system includes one or more computer system includes one or more computer processors, one or more computer readable storage media, and program instructions stored on the computer readable storage media for execution by at least one of the one or more processors. The program instructions include instructions to determine a point in a Bloch sphere based on the qubit, in which the point is defined by a value of colatitude (theta) with respect to the z-axis of the Bloch sphere, and a value of longitude (phi) with respect to the x-axis of the Bloch sphere. The program instructions further include instructions to convert the value of colatitude (theta) to a value of a first variable of a sensory output space. The program instructions further include instructions to convert the value of longitude (phi) to a value of a second variable of the sensory output space.

BRIEF DESCRIPTION OF THE DRAWINGS

Embodiments of the present invention will now be described, by way of example only, with reference to the following drawings, in which.

DETAILED DESCRIPTION

Figure 1:
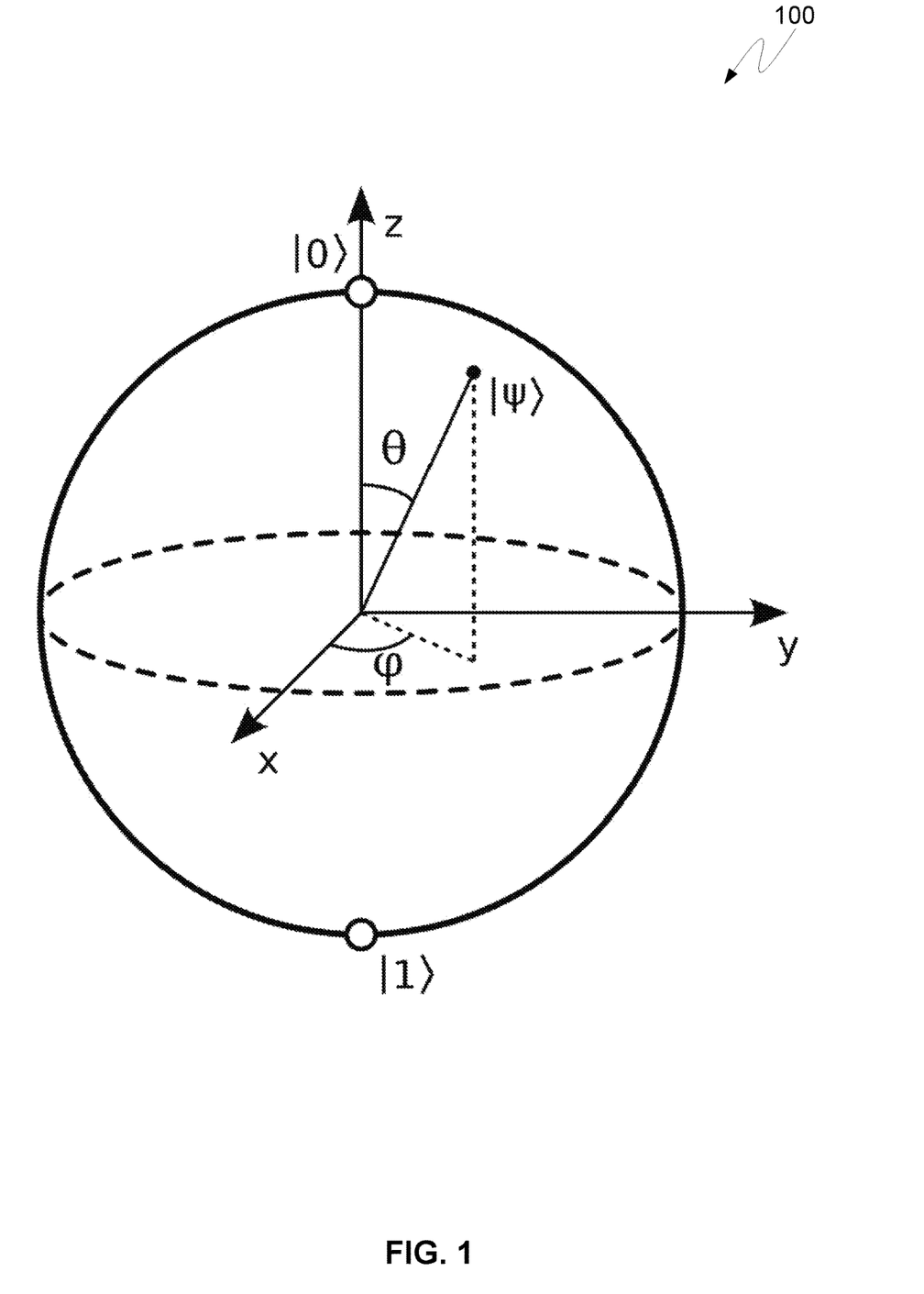
FIG. 1 is a Bloch sphere representation of a qubit, generally designated 100, in accordance with at least one embodiment of the present invention.

The possible quantum states for a single qubit can be visualized using a Bloch sphere. By way of example, FIG. 1 depicts a Bloch sphere representation of a qubit, generally designated 100, in accordance with at least one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

As depicted in FIG. 1, the surface of the Bloch sphere is a two-dimensional space, which represents the state space of the pure qubit states. Represented on such a 2-sphere, a classical bit can only be at the "North Pole" or the "South Pole", in the locations where |0> and |1> are respectively. However, this particular choice of the polar axis is arbitrary. The rest of the surface of the Bloch sphere is inaccessible to a classical bit, but a pure qubit state can be represented by any point on the surface. Accordingly, the value of a qubit is a vector inside the Bloch sphere, and it can take any vector inside this sphere as long as it starts from the origin and is of length one (1). As further depicted in FIG. 1, an example of a value of a qubit is shown. The value of the qubit can be uniquely described using the two angles depicted in FIG. 1, namely: the colatitude with respect to the z-axis, denoted θ (theta), and the longitude with respect to the x-axis, denoted φ (phi).

Quantum operators (or gates) move the vector around the Bloch sphere. However, embodiments of the present invention recognize that the movement of the vector around the Bloch sphere can be difficult for an observer to comprehend or visualize. Accordingly, embodiments of the present invention recognize that gaining an understanding or appreciation of how a quantum operator or gate affects the state of a qubit (e.g. during the execution of a quantum program) can be difficult.

Embodiments of the present invention provide for the generation of a sensory representation (such as an output of a quantum computing system) of a qubit state, thereby enabling a user to gain an understanding and/or appreciation of how a quantum operation affects the state of a qubit.

In various embodiments, a representation of a qubit is mapped (e.g. converted) to an alternative output space from that of the Bloch sphere. In particular, various embodiments map the values used to represent a qubit in the Bloch sphere, namely $\theta$ (theta) and $\varphi$ (phi) to respective values of first and second variables of a different output space. By doing so, embodiments of the present invention provide for an alternative or different representation of the qubit which makes it clearer to an observer how a quantum operator (e.g. gate) affects the state of the qubit. Accordingly, embodiments of the present invention enable a user to gain an improved understanding or appreciation of changes in the state of a qubit over the execution of a full quantum program.

In some embodiments, the angles which represent the qubit—the colatitude (theta) with respect to the z-axis of the Bloch sphere, and the longitude (phi) with respect to the x-axis of the Bloch sphere—are mapped onto a more meaningful sensory output space. For example, the sensory output space may include a color output space, a tactile output space, an auditory output space, etc. In various embodiments, a representation of a qubit is provided as a sensory output that it easier for a user to understand and/or appreciate when a value of the qubit changes. This can allow for improved understanding of how a qubit state changes as a result of one or more quantum operations being applied to the qubit.

In various embodiments, conversion of a representation of a qubit in the Bloch sphere to an alternative sensory space (e.g., color space or auditory output space) is configured such that vectors which are close to each other on the Bloch sphere will have similar outputs in the alternative sensory output space (e.g. similar colors of a Hue Saturation Value (HSV) color space). This can help a user to understand (e.g. visually or audibly) how a quantum operation affects the state of a qubit.

In various embodiments, a Bloch sphere representation of a qubit can be mapped (e.g., converted) to any other suitable sensory output space that has two or more parameters that can be meaningfully related. For instance, in the Bloch sphere, there are two free parameters, theta and phi, and the third parameter, the length of the vector, is fixed. Thus, a sensory output space of an embodiment may include two or more parameters that can have various values. An example of this could be sound, where the two free/variable parameters are pitch and volume, and the fixed value could be a location the sound is coming from. By way of example, a value of theta is mapped to a value of pitch, and a value of phi is mapped to a value of volume. Accordingly, in an embodiment, the sensory output space may include a third variable. Here, generating a sensory representation of a qubit further includes defining the value of the third variable to be equal to a predetermined constant value.

Embodiments of the present invention help beginners to understand how quantum operators affect the state of a qubit. Additionally, adjusting scaling factors used in the conversions of a representation of a qubit in the Bloch sphere to an alternative sensory space in accordance with embodiments of the present invention can help more advanced users distinguish between qubit states which are close to each other in the Bloch sphere. By way of example, the sensory output space of an embodiment may include a color space. Here, a visual representation of a qubit is generated that differs from a Bloch sphere representation, in which the visual representation employs color values to represent and/or distinguish qubit states.

For instance, in an embodiment, the sensory output space includes a Hue Saturation Value (HSV) space. In this embodiment, converting the value of colatitude (theta) to a value of a first variable of a sensory output space includes converting the value of colatitude (theta) to a value of "Value" for the HSV space. Similarly, converting the value of longitude (phi) to a value of a second variable of the sensory output space includes converting the value of longitude (phi) to a value of "Hue" for the HSV space. Put another way, a Bloch sphere representation of a qubit is mapped to an HSV color space, in which mapping is achieved by converting values of theta and phi to values of "Value" and "Hue" of the color space, respectively.

By way of example, converting the value of colatitude (theta) to a value of "Value" for the HSV space may include dividing the value of colatitude (theta) by pi. Similarly, converting the value of longitude (phi) to a value of "Hue" for the HSV space may include dividing the value of longitude (phi) by 2*pi. Accordingly, embodiments of the present invention employ relatively simple mathematical operations that can be used in a cheap and easy manner, thus minimizing the cost and/or complexity requirements for generating sensory representations of qubits.

In various embodiments, the value of "Saturation" for HSV space is defined to be equal to a predetermined constant value. By way of example, the predetermined constant value may be equal to one. Accordingly, in the example(s) described, a representation of a qubit is provided in the HSV cylinder. This can be achieved by converting the angle theta from the Bloch sphere representation of the qubit to "Value" for the HSV space, and by converting the angle phi from the Bloch sphere representation of the qubit to "Hue" for the HSV space. "Saturation" may be kept as a constant value, e.g. one (1), as all vectors must be of length one (1) in the Bloch sphere.

In some embodiments, a scaling factor is further applied to at least one of the values of the first and second variables. For instance, adjustments can be made during the conversion if required or preferred. By way of example, in many quantum circuits, a lot of time is spent where the vector is parallel to the x axis in the Bloch sphere, and this may be mapped to a "Value" of ½ in the HSV color space. This can make the colors dim for some output devices, and so the output can still be meaningful if the "Value" is scaled (e.g. multiplied by 1.2) to make the color appear brighter (but capped at being 1 as this is the highest value allowed in an HSV mapping).

In some embodiments, the sensory output space is a sound (e.g. audible) output. In such embodiments, converting the value of colatitude (theta) to a value of a first variable of a sensory output space includes converting the value of colatitude (theta) to a value of a first parameter of sound. Similarly, converting the value of longitude (phi) to a value of a second variable of the sensory output space includes converting the value of longitude (phi) to a value of a second, different parameter of sound. Thus, rather than generating a visual representation of a qubit in some embodiments, other embodiments generate an audio representation of a qubit. Such embodiments can be particularly advantageous for users who are color blind, visually impaired, or otherwise find it difficult to appreciate a distinction between visual representations of a state of a qubit.

In some embodiments, the sensory output space is a tactile output. In such embodiments, converting the value of colatitude (theta) to a value of a first variable of a sensory output space includes converting the value of colatitude (theta) to a value of a first parameter of a tactile output. Similarly, converting the value of longitude (phi) to a value of a second variable of the sensory output space includes converting the value of longitude (phi) to a value of a second, different parameter of the tactile output. In this way, a tactile representation of a qubit is generated. Such embodiments may be particularly advantageous for users who are deaf, visually impaired, or otherwise find it difficult to appreciate a distinction been visual and/or audible representations of a state of a qubit.

Accordingly, embodiments of the present invention generate alternative representations of qubits in various different sensory output spaces. In various embodiments, a Bloch sphere representation of a qubit is converted to a visual, audio, tactile, etc., representation that may be easier for a user to understand and/or perceive changes in the state of a qubit. In these embodiments, a point in a Bloch sphere is determined based on the qubit, in which the point is defined by a value of colatitude (theta) with respect to the z-axis of the Bloch sphere and a value of longitude (phi) with respect to the x-axis of the Bloch sphere. The Bloch sphere representation of a qubit is converted to an alternative representation within a different sensory output space. In particular, various embodiments convert the value of colatitude (theta) to a value of a first variable of a sensory output space, and convert the value of longitude (phi) to a value of a second variable of the sensory output space.

Embodiments of the present invention therefore provide for a tool through which an alternative representation of a qubit is obtained. Such an alternative representation enables a user to gain an improved understanding of how a quantum operation affects a qubit since the alternative representation can be provided as various types of sensory outputs that enable a user to more easily perceive alterations in the state of a qubit. In various embodiments, values of a Bloch sphere representation of a qubit are converted to values of respective parameters of another visually, auditorily, and/or tactilely perceivable output space. Thus, output spaces provided by these various embodiments include a representation(s) of a qubit that can be perceived by a human sense. By way of example, the sensory output space can include one or more of a color space (such as a HSV or HSL color space), an auditory space (such as audio/sound), and a tactile space that help to facilitate improved understanding of quantum circuits or systems. Thus, embodiments of the present invention provide for facilitating improved understanding of quantum circuits and/or quantum systems by generating representations of qubits in a sensory output space that is easy for a user to perceive changes in a qubits state.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. It should be understood that the Figures are merely schematic and are not drawn to scale. It should also be understood that the same reference numerals are used throughout the Figures to indicate the same or similar part. Furthermore, the terminology used herein was chosen to best explain the principles of the embodiments, the practical application or technical improvement over technologies found in the marketplace, or to enable others of ordinary skill in the art to understand the embodiments disclosed herein.

Figure 2:
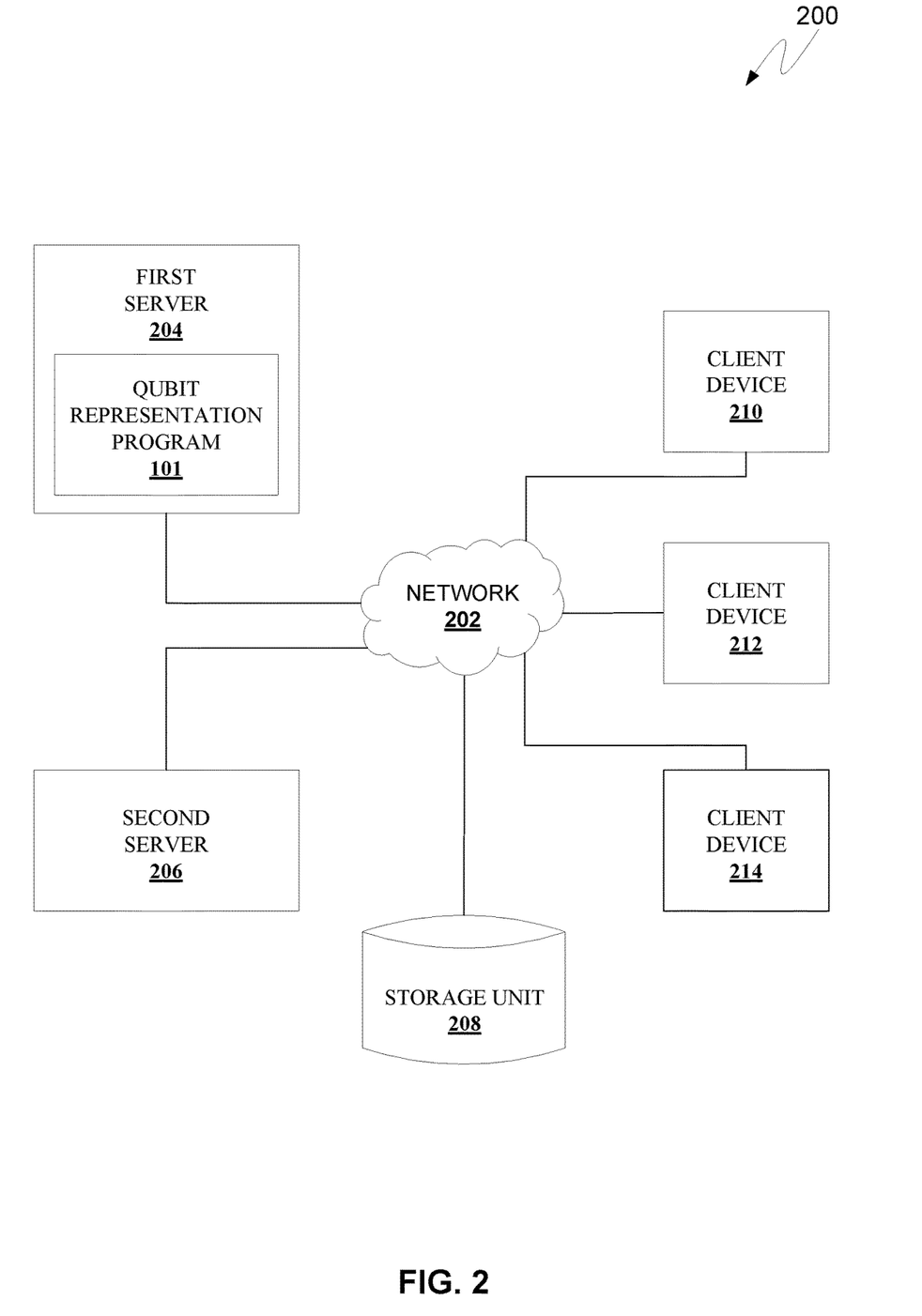
FIG. 2 is a block diagram of distributed data processing environment, generally designated 200, suitable for operation of a qubit representation program 101 in accordance with at least one embodiment of the present invention.

The present invention will now be described in detail with reference to the Figures. FIG. 2 is a block diagram of distributed data processing environment, generally designated 200, suitable for operation of qubit representation program 101 in accordance with at least one embodiment of the present invention. FIG. 2 provides only an illustration of one implementation and does not imply any limitations with regard to the environments in which different embodiments may be implemented. Many modifications to the depicted environment may be made by those skilled in the art without departing from the scope of the invention as recited by the claims.

As depicted in FIG. 2, distributed data processing environment 200 includes qubit representation program 101, first server 204, second server 206, storage unit 208, client device 210, client device 212, and client device 214 interconnected over network 202. In embodiments of the invention, network 202 can be a telecommunications network, a local area network (LAN), a wide area network (WAN), such as the Internet, or a combination of the three, and can include wired, wireless, or fiber optic connections. Network 202 can include one or more wired and/or wireless networks that are capable of receiving and transmitting data, voice, and/or video signals, including multimedia signals that include voice, data, and video information. In general, network 202 can be any combination of connections and protocols that will support communications between various programs, devices and/or computers within distributed data processing environment 200.

In various embodiments, first server 204 and second server 206 are computing devices that can be a standalone device, a management server, a web server, a mobile device, or any other electronic device or computing system capable of receiving, sending, and processing data. In other embodiments, first server 204 and second server 206 are server computing systems utilizing multiple computers as a server system, such as in a cloud computing environment. In an embodiment, first server 204 and second server 206 represent a computing system utilizing clustered computers and components (e.g. database server computers, application server computers, web server computers, etc.) that act as a single pool of seamless resources when accessed within distributed data processing environment 200. In general, first server 204 and second server 206 represent any programmable electronic device or combination of programmable electronic devices capable of executing machine readable program instructions and communicating with various computing devices depicted (and other computing devices not depicted) within distributed data processing environment 200 via a network, such as network 202. For example, first server 204 and/or second server 206 provide data, such as boot files, operating system images, and applications to client device 210, client device 212, and client device 214. Although qubit representation program 101 is depicted in FIG. 2 as being integrated with first server 204, in alternative embodiments, qubit representation program 101 is remotely located from first server 204.

In various embodiments, client device 210, client device 212, and client device 214 are computing devices that can be a laptop computer, tablet computer, netbook computer, personal computer (PC), a desktop computer, a personal digital assistant (PDA), a smartphone, smartwatch, or any programmable electronic device capable of receiving, sending, and processing data. In general, client device 210, client device 212, and client device 214 represent any programmable electronic devices or combination of programmable electronic devices capable of executing machine readable program instructions and communicating with various computing devices depicted (and other computing device not depicted) within distributed data processing environment 200 via a network, such as network 202.

In various embodiments, client device 210, client device 212, and client device 214 allow a user to send, receive, or otherwise access data from storage unit 208 via first server 204 and/or second server 206. Client device further includes a user interface that provides an interface between the various computing devices depicted (and additional computing devices not depicted) within distributed data processing environment 200. In some embodiments, the user interface can be a graphical user interface (GUI) or a web user interface (WUI) and can display text, documents, web browser windows, user options, application interfaces and instructions for operation, and includes the information (such as graphic, text, and sound) that a program presents to a user and the control sequences the user employs to control the program. In other embodiments, user interface can be mobile application software that provides an interface between the various computing devices depicted (and additional computing devices not depicted) within distributed data processing environment 200.

Figure 3:
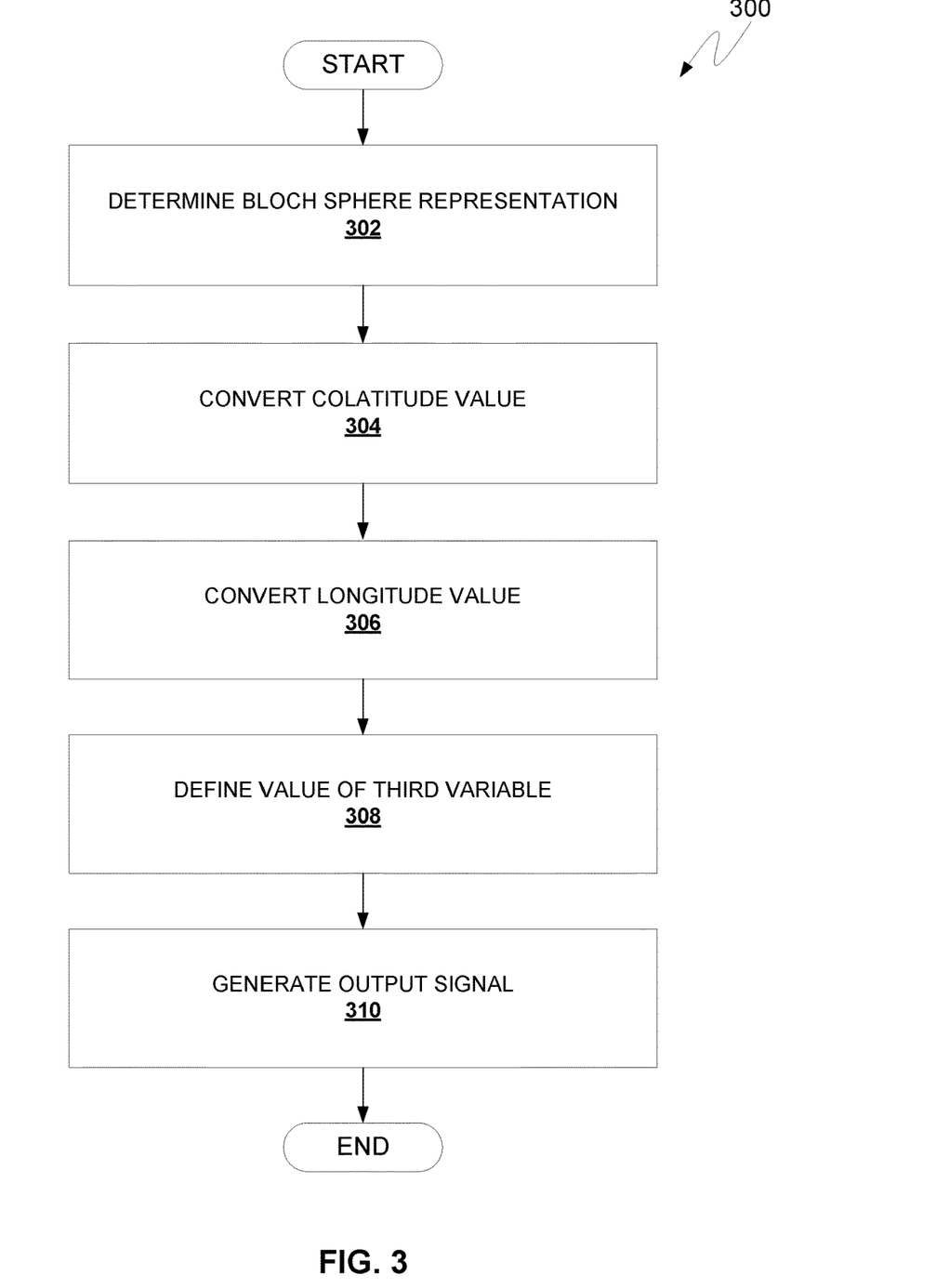
FIG. 3 is a flow chart diagram depicting operational steps for generating a sensory representation of a qubit by qubit representation program 101, generally designated 300, in accordance with at least one embodiment of the present invention.

FIG. 3 is a flow chart diagram depicting operational steps for generating a sensory representation of a qubit by qubit representation program 101, generally designated 300, in accordance with at least one embodiment of the present invention. More particularly, FIG. 3 is a flow chart diagram depicting operational steps for generating an HSV color output space representation of a qubit. FIG. 3 provides only an illustration of one implementation and does not imply any limitations with regard to the environments in which different embodiments may be implemented. Many modifications to the depicted environment may be made by those skilled in the art without departing from the scope of the invention as recited by the claims.

At step S302, qubit representation program 101 determines a point in a Bloch sphere based on a qubit. In various embodiments, the point in the Bloch sphere is defined by a value of colatitude (theta) with respect to the z-axis of the Bloch sphere, and a value of longitude (phi) with respect to the x-axis of the Bloch sphere. Accordingly, determining a point in a Bloch sphere based on a qubit includes determining the values for colatitude (theta) and longitude (phi), respectively, that define a point in the Bloch sphere. One of ordinary skill will appreciate that determining a Bloch sphere representation of a qubit state can be accomplished using any generally known, conventional approaches/techniques.

At step S304, qubit representation program 101 converts the value of colatitude (theta) to a value of a first variable of a sensory output space. In an embodiment, the first variable has a first range of allowable values that is different from the range of allowable values for colatitude (theta). More specifically, because the sensory output space is an HSV color space, converting the value of colatitude (theta) to a value of a first variable of a sensory output space includes converting the value of colatitude (theta) to a value of "Value" for the HSV space. Such conversion of the value of colatitude (theta) to a value of "Value" for the HSV space by qubit representation program 101 includes dividing the value of colatitude (theta) by pi (because theta may range from zero to pi, whereas "Value" may only range between zero (0) and one (1) for the HSV color space).

At step S306, qubit representation program 101 converts the value of longitude (phi) to a value of a second variable of the sensory output space. In an embodiment, the second variable has a second range of allowable values that is different from the range of allowable values for longitude (phi). More specifically, because the sensory output space is an HSV color space, converting the value of longitude (phi) to a value of a second variable of the sensory output space includes converting the value of longitude (phi) to a value of "Hue" for the HSV space. Such conversion of the value of longitude (phi) to a value of "Hue" for the HSV space by qubit representation program 101 includes dividing the value of longitude (phi) by 2*pi (because phi may range from zero to 2*pi, whereas "Hue" may only range between zero (0) and one (1) for the HSV color space).

At step S308, qubit representation program 101 defines a value of a third variable to be equal to a predetermined constant value. One of ordinary skill will appreciate that the HSV color space includes three variables, namely: (i) hue, (ii) saturation, and (iii) value. Accordingly, the third variable for which qubit representation program 101 defines a constant value for is "Saturation." Here, qubit representation program 101 defines the constant value of the third variable "Saturation" to be equal to one (1). In other words, the value of "Saturation" is set to a constant value of one (1).

At step S310, qubit representation program 101 generates an output signal representative of the values for "Hue," "Saturation," and "Value." In an embodiment, the output signal controls a color(s) displayed to a user, wherein the display color(s) represent a state(s) of the qubit.

One of ordinary skill will appreciate that embodiments of the present invention are based on a concept of mapping (e.g., converting) the angles which represent a qubit in a Bloch sphere onto a meaningful sensory output space. In the preceding steps of FIG. 3, the sensory output space includes the HSV cylinder, and the conversion includes: (i) mapping the angle theta from the Bloch sphere representation to a value of "Value" for the HSV space, and (ii) mapping the angle phi from the Bloch sphere representation to a value of "Hue" for the HSV space. Furthermore, "Saturation" is kept as a constant value of one (1), since all vectors must be of length one (1) in the Bloch sphere.

The mapping includes making adjustments in order to convert from the Bloch angle to the HSV value, as the Bloch angles are in terms of pi and HSV values vary between 0 and 1. Thus, in order to convert from the Bloch angle to the HSV value, qubit representation program 101 divides phi by 2*pi, and divides theta by pi (as theta only varies over pi in the Bloch sphere representation). It should be understood that alternative output spaces may need similar forms of adjustment, and such adjustments may comprise straightforward and/or simple mathematical operations.

In some embodiments, adjustments, if required, can also be made during the conversion. For example, in many quantum circuits, a lot of time may be spent where the Bloch sphere vector is parallel to the x axis, and so has a "Value" of ½. This can make the colors dim for some output devices, and so the output is still meaningful if the "Value" is scaled. By way of example, an output value is multiplied by 1.2 to make the color appear brighter (but capped at 1 as this is the highest value allowed in an HSV mapping).

In some embodiments, where conversion is used to represent how the state of a qubit changes throughout the execution of a circuit, qubit representation program 101 updates the mapping based on the range of values the qubit takes during the execution of the circuit. For example, if the quantum operations of the circuit are known in advance, this information can be used to determine the range of values that theta and phi take. Thus, based on the determined range of values that theta and phi take, qubit representation program 101 scales the converted values in the sensory output space to maximize the usage of the available range of the output space.

For instance, qubit representation program 101 obtains the range of values by multiplying the matrices representing the operations/gates used and theta and phi extracted from the resulting matrices. The mapping can then alter the values of theta and phi. For example, if it is known that the largest value for theta used in the circuit is pi/2, then qubit representation program 101 can use this information to adjust the conversion operation to multiply all values of theta by 2, so that the full range of available colors is used. This ultimately provides the benefit of improving accessibility, e.g., by modifying the values used to avoid colors which a user cannot discriminate between due to, e.g., color-blindness.

In some instances, conversion to a color space may be more meaningful to an observer, as vectors which are close to each other on the Bloch sphere will have similar outputs. For example, in the HSV space, vectors which are close to each other are represented as similar colors. This can help a user to visually understand how an operation affects the state of a qubit.

In various embodiments, qubit representation program 101 generates other sensory output spaces having two or more variable elements that can be meaningfully related. In the Bloch sphere, there are two variable parameters—theta and phi, and a third fixed parameter—the length of the vector. Thus, in an embodiment, a sensory output space can include an auditory output space (i.e. sound output), wherein the two variable elements are pitch and volume (and the fixed value could be the location the sound is coming from). For instance, qubit representation program 101 converts the value for phi to a pitch value and converts the value for theta to a volume value.

Figure 4:
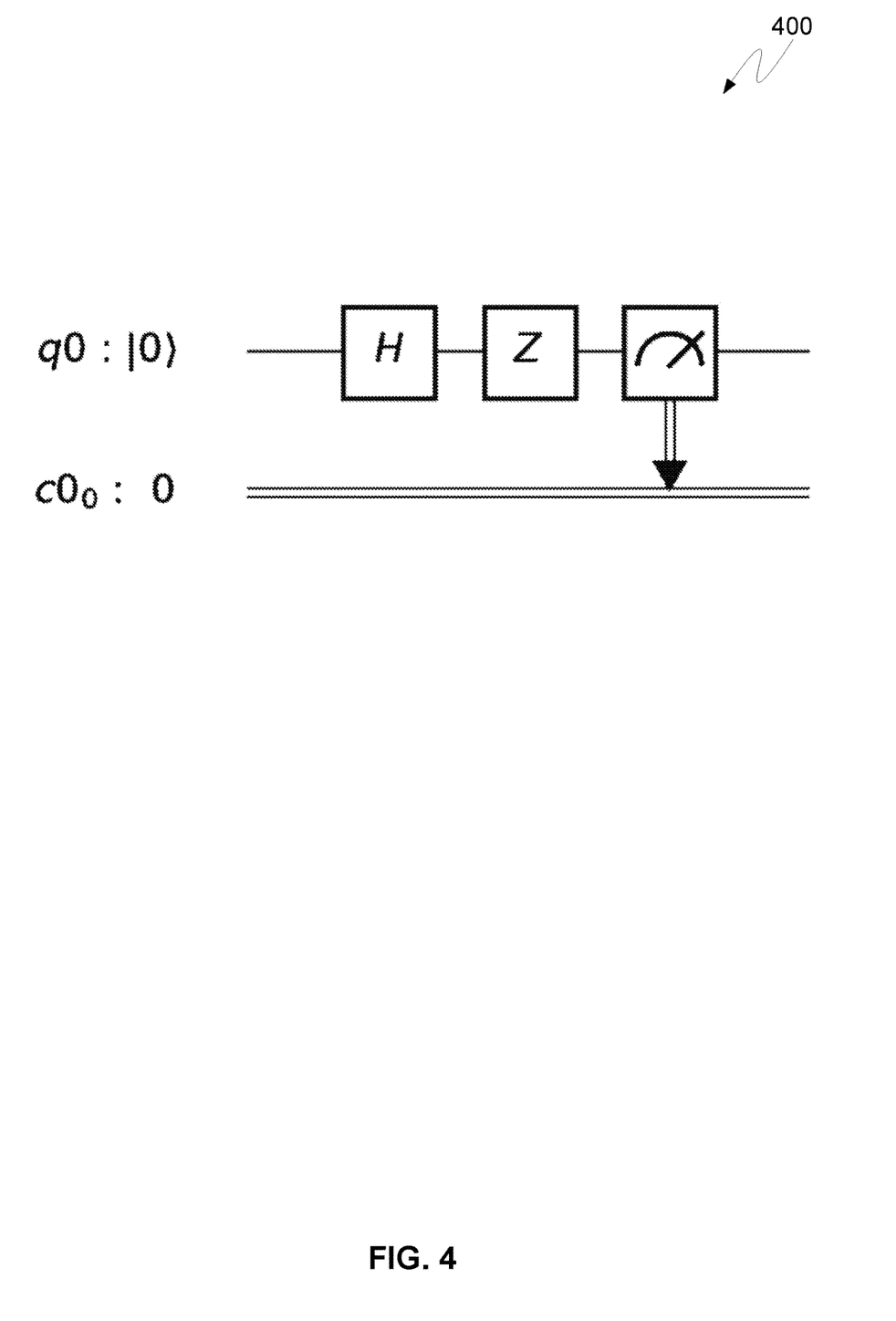
FIG. 4 is a diagram of an exemplary quantum circuit, generally designated 400, in accordance with at least one embodiment of the present invention.

FIG. 4 is a diagram of an exemplary quantum circuit, generally designated 400, in accordance with at least one embodiment of the present invention. FIG. 4 provides only an illustration of one implementation and does not imply any limitations with regard to the environments in which different embodiments may be implemented. Many modifications to the depicted environment may be made by those skilled in the art without departing from the scope of the invention as recited by the claims.

By way of example, if the largest value for theta is determined to be pi/2, and the largest value of phi is pi, qubit representation program 101 determines to employ a scaling factor of 2× for theta and 2× for phi. This scaling ensures that all colors in the HSV color space can be used, for example, by having the range of theta and phi now span all their respective ranges. Here, the system is initialized so that every qubit has a state of |0>. In other words, the values of theta and phi are both zero (0). When these values are mapped to the HSV space, the depicted color is white.

In various embodiments, qubit representation program 101 applies an "H" gate to a first state of a qubit. This makes the values of a and b of the first qubit equal to 1/root2 and as a vector, the first qubit is now aligned with the positive x axis with angles of theta=pi/2, phi=0 respectively. This gives the representation of the state of the first qubit a red color of half intensity, as red is where zero (0) for "Hue" is on the HSV space and phi is 0. The scaling factor determined above can then be applied if desired, to give theta=pi and phi=0. This gives the same red color, but now with full intensity.

In various embodiments, qubit representation program 101 applies a "Z" gate to the first qubit. This is a pi radian rotation about the Z axis of the Bloch sphere by pi radians. Here, the angles of the first qubit therefore go to theta=pi/2 and phi=pi. This gives the representation of a second state of the first qubit a cyan color (as cyan is opposite red in the HSV space). The scaling factor determined above can then be applied again to give theta=pi and phi=2pi, and this changes the color back to being red with full intensity (as a rotation by 2pi is the same as a rotation by 0). Although scaling does not provide a stark contrast in this exemplary circuit (red vs. cyan), a greater contrast can be evinced in more complex circuits where theta and phi have greater variations.

In various embodiments, qubit representation program 101 measures the first qubit, which causes the vector to align with one of the poles (the qubit has a theta of pi or zero (0)). This gives the representation of a third state of the first qubit of black or white, respectively.

One of ordinary skill will appreciate that converting a Bloch sphere representation of a qubit to an alternative sensory output space (such as a color space, an audio output space, or a tactile output space) can help beginners to understand how quantum operations (e.g. gates) affect the state of a qubit. Furthermore, adjusting the converted values using scaling factors can help advanced users distinguish between states which are close to each other in the Bloch sphere.

Figure 5:
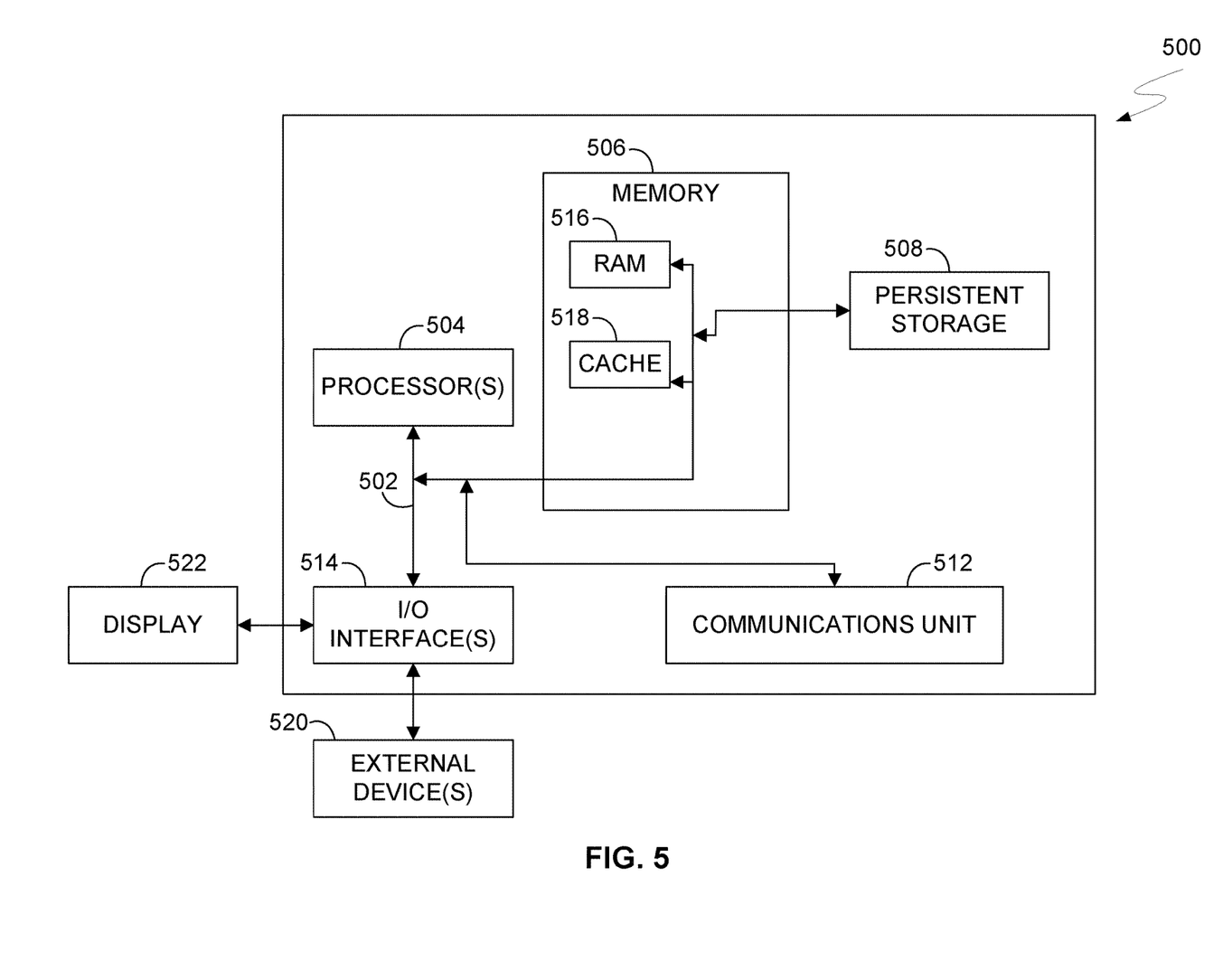
FIG. 5 is a block diagram depicting components of a computing device, generally designated 500, suitable for executing a qubit representation program 101 in accordance with at least one embodiment of the present invention.

FIG. 5 is a block diagram depicting components of a computing device, generally designated 500, suitable for executing qubit representation program 101, first server 204, second server 206, storage unit 208, client device 210, client device 212, client device 214, and any additional computing devices not depicted in distributed data processing environment 200 of FIG. 2 in accordance with at least one embodiment of the invention. Computing device 500 includes one or more processor(s) 504 (including one or more computer processors), communications fabric 502, memory 506 including, RAM 516 and cache 518, persistent storage 508, communications unit 512, I/O interface(s) 514, display 522, and external device(s) 520. It should be appreciated that FIG. 5 provides only an illustration of one embodiment and does not imply any limitations with regard to the environments in which different embodiments may be implemented. Many modifications to the depicted environment may be made.

As depicted, computing device 500 operates over communications fabric 502, which provides communications between computer processor(s) 504, memory 506, persistent storage 508, communications unit 512, and input/output (I/O) interface(s) 514. Communications fabric 502 can be implemented with any architecture suitable for passing data or control information between processor(s) 504 (e.g., microprocessors, communications processors, and network processors), memory 506, external device(s) 520, and any other hardware components within a system. For example, communications fabric 502 can be implemented with one or more buses.

Memory 506 and persistent storage 508 are computer readable storage media. In the depicted embodiment, memory 506 includes random-access memory (RAM) 516 and cache 518. In general, memory 506 can include any suitable volatile or non-volatile one or more computer readable storage media.

Program instructions for qubit representation program 101 can be stored in persistent storage 508, or more generally, any computer readable storage media, for execution by one or more of the respective computer processor(s) 504 via one or more memories of memory 506. Persistent storage 508 can be a magnetic hard disk drive, a solid-state disk drive, a semiconductor storage device, read-only memory (ROM), electronically erasable programmable read-only memory (EEPROM), flash memory, or any other computer readable storage media that is capable of storing program instructions or digital information.

Media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 512, in these examples, provides for communications with other data processing systems or devices. In these examples, communications unit 512 can include one or more network interface cards. Communications unit 512 may provide communications through the use of either or both physical and wireless communications links. In the context of some embodiments of the present invention, the source of the various input data may be physically remote to computing device 500 such that the input data may be received, and the output similarly transmitted via communications unit 512.

I/O interface(s) 514 allows for input and output of data with other devices that may operate in conjunction with computing device 500. For example, I/O interface(s) 514 may provide a connection to external device(s) 520, which may be as a keyboard, keypad, a touch screen, or other suitable input devices. External device(s) 520 can also include portable computer readable storage media, for example thumb drives, portable optical or magnetic disks, and memory cards. Software and data used to practice embodiments of the present invention can be stored on such portable computer readable storage media and may be loaded onto persistent storage 508 via I/O interface(s) 514. I/O interface(s) 514 also can similarly connect to display 522. Display 522 provides a mechanism to display data to a user and may be, for example, a computer monitor.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
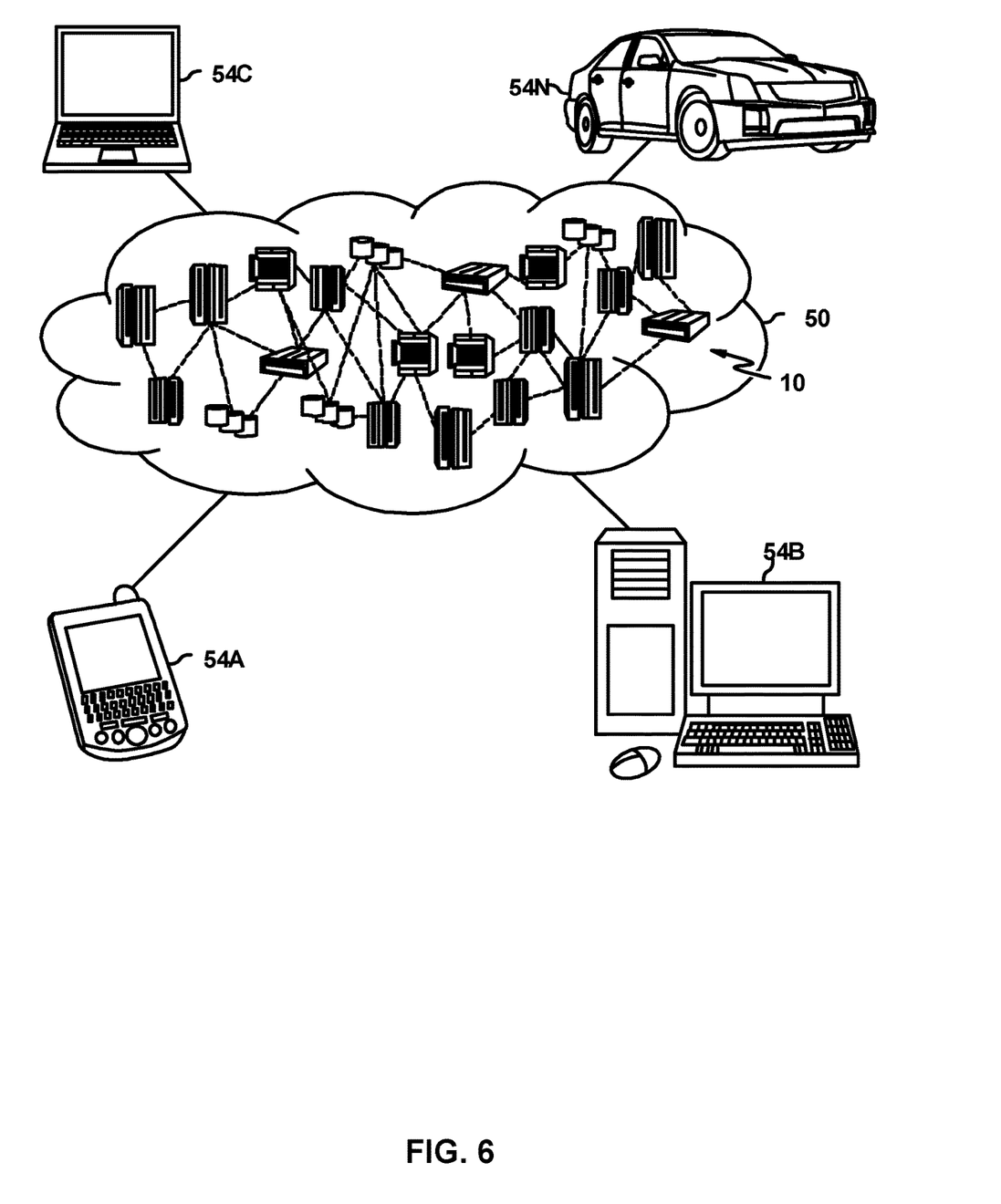
FIG. 6 is a block diagram depicting a cloud computing environment in accordance with at least one embodiment of the present invention.

FIG. 6 is a block diagram depicting a cloud computing environment 50 in accordance with at least one embodiment of the present invention. Cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
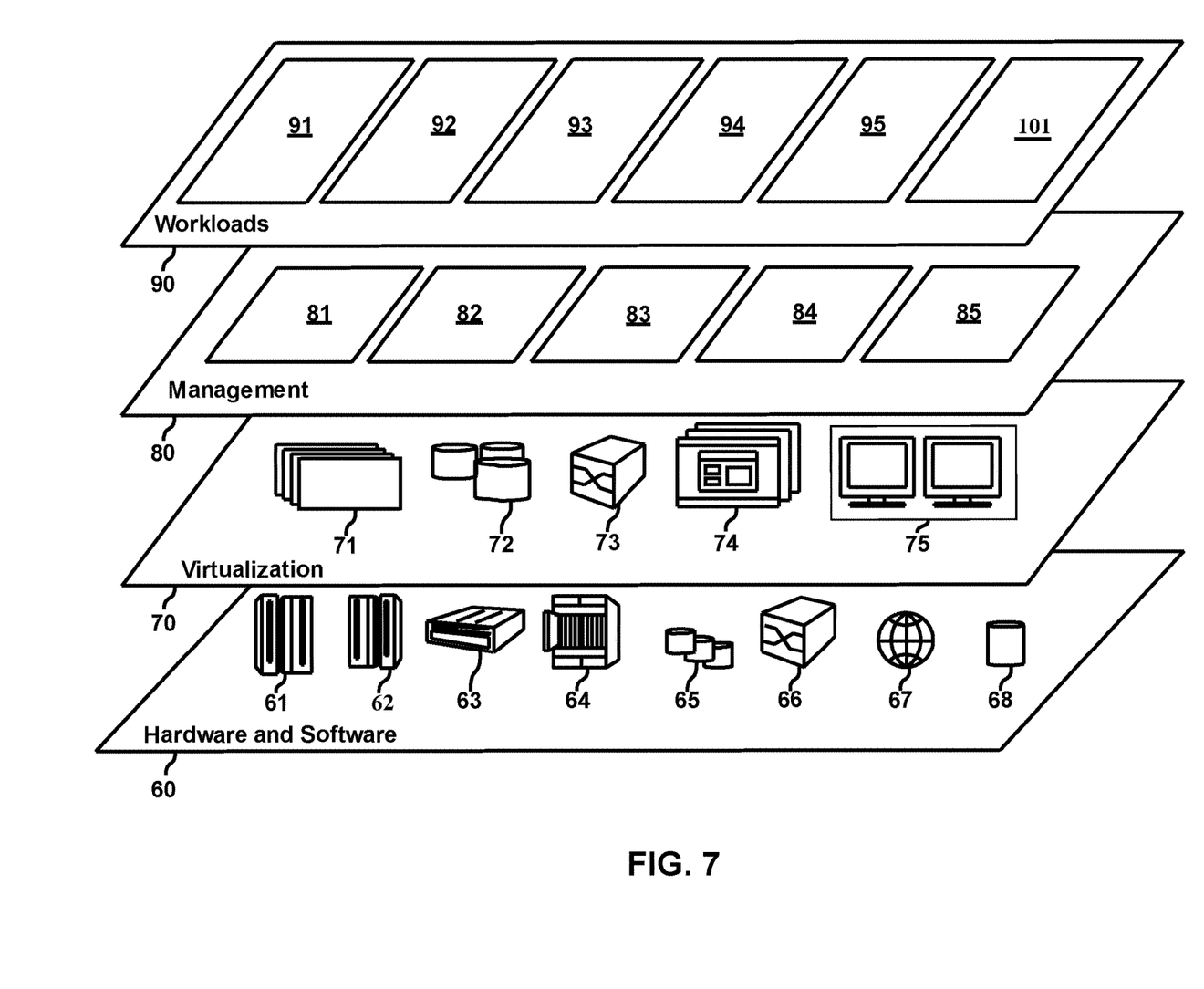
FIG. 7 is block diagram depicting abstraction model layers in accordance with at least one embodiment of the present invention.

FIG. 7 is block diagram depicting a set of functional abstraction model layers provided by cloud computing environment 50 depicted in FIG. 6 in accordance with at least one embodiment of the present invention. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and qubit representation program 101.

What is claimed is:

1. A computer-implemented method of generating a sensory representation of a qubit, the method comprising:
    determining, by one or more processors, a point in a Bloch sphere based on the qubit, wherein the point is defined by a value of colatitude (theta) with respect to the z-axis of the Bloch sphere and a value of longitude (phi) with respect to the x-axis of the Bloch sphere; and
    mapping the values of colatitude (theta) and longitude (phi) of the point in the Bloch sphere to first and second variables of a sensory output space, wherein the mapping includes:
        converting, by the one or more processors, the value of colatitude (theta) of the point in the Bloch sphere to a value of the first variable of the sensory output space; and
        converting, by the one or more processors, the value of longitude (phi) of the point in the Bloch sphere to a value of the second variable of the sensory output space.

2. The computer-implemented method of claim 1, further comprising:
    determining, by the one or more processors, that the sensory output space includes a third variable; and
    defining, by the one or more processors, a value of the third variable to be equal to a predetermined constant value.

3. The computer-implemented method of claim 1, wherein the sensory output space includes a color space.

4. The computer-implemented method of claim 3, wherein the sensory output space includes a Hue Saturation Value (HSV) space, wherein:
    converting, by the one or more processors, the value of colatitude (theta) of the point in the Bloch sphere to the value of the first variable of the sensory output space includes converting the value of colatitude (theta) to a value of Value for the HSV space; and
    converting, by the one or more processors, the value of longitude (phi) of the point in the Bloch sphere to the value of the second variable of the sensory output space includes converting the value of longitude (phi) to a value of Hue for the HSV space.

5. The computer-implemented method of claim 4, wherein:
    converting, by the one or more processors, the value of colatitude (theta) of the point in the Bloch sphere to a value of Value for the HSV space includes dividing the value of colatitude (theta) by pi; and
    converting, by the one or more processors, the value of longitude (phi) of the point in the Bloch sphere to a value of Hue for the HSV space includes dividing the value of longitude (phi) by 2*pi.

6. The computer-implemented method of claim 4, further comprising:

defining, by the one or more processors, a value of Saturation for the HSV space to be equal to the predetermined constant value.

7. The computer-implemented method of claim 6, wherein the predetermined constant value is equal to one.

8. The computer-implemented method of claim 1, further comprising:
applying, by the one or more processors, a scaling factor to at least one of the values of the first and second variables.

9. The computer-implemented method of claim 1, wherein:
converting, by the one or more processors, the value of colatitude (theta) of the point in the Bloch sphere to the value of the first variable of the sensory output space includes converting the value of colatitude (theta) to a value of a first parameter of sound; and
converting, by the one or more processors, the value of longitude (phi) of the point in the Bloch sphere to the value of the second variable of the sensory output space includes converting the value of longitude (phi) to a value of a second, different parameter of sound.

10. The computer-implemented method of claim 1, wherein:
converting, by the one or more processors, the value of colatitude (theta) of the point in the Bloch sphere to the value of the first variable of the sensory output space includes converting the value of colatitude (theta) to a value of a first parameter of a tactile output; and
converting, by the one or more processors, the value of longitude (phi) of the point in the Bloch sphere to the value of the second variable of the sensory output space includes converting the value of longitude (phi) to a value of a second, different parameter of the tactile output.

* * * * *